US006315960B1

(12) United States Patent
Shiban

(10) Patent No.: US 6,315,960 B1
(45) Date of Patent: *Nov. 13, 2001

(54) APPARATUS FOR TREATING PYROPHORIC GASES AND TOXIC GLOBAL WARMING GASES

(76) Inventor: Samir S. Shiban, 367 W. Chicago St., Chandler, AZ (US) 85224

( * ) Notice: Subject to any disclaimer, the term of this patent is extended or adjusted under 35 U.S.C. 154(b) by 0 days.

This patent is subject to a terminal disclaimer.

(21) Appl. No.: 09/359,412

(22) Filed: Jul. 23, 1999

(51) Int. Cl.[7] ........................................ B32B 27/02
(52) U.S. Cl. .................. 422/168; 422/169; 422/171; 422/182; 422/228; 55/413; 55/427; 55/436; 55/439; 55/446; 55/465
(58) Field of Search ................... 422/168, 169, 422/171, 182, 228, 170, 172, 224, 210; 55/413, 427, 436, 439, 446, 465, 463

(56) References Cited

U.S. PATENT DOCUMENTS 6,030,585 * 2/2000 Shiban .................................. 422/168

* cited by examiner

Primary Examiner—Marian C. Knode
Assistant Examiner—Frederick Varcoe
(74) Attorney, Agent, or Firm—James D. Givnan, Jr.

(57) ABSTRACT

A mixing chamber receives pyrophoric gas for mixing with oxygen prior to discharge into an upright housing of the apparatus. Tubular members within the housing define annular passageways through which the mixed gas and oxygen flow in a serpentine manner with reversal of flow direction promoting the precipitation of matter. A receptacle is removably attached to the housing for collection of matter with mounting means enabling periodic receptacle removal for cleaning. An enclosure about a housing end includes a door for access to the receptacle. Provision is made for ventilating of the enclosure to an exhaust conduit during door opening to prevent escape of gas and particulate to the atmosphere. A modified form of apparatus includes a filter and chemical bed for further treatment of the flow.

11 Claims, 3 Drawing Sheets

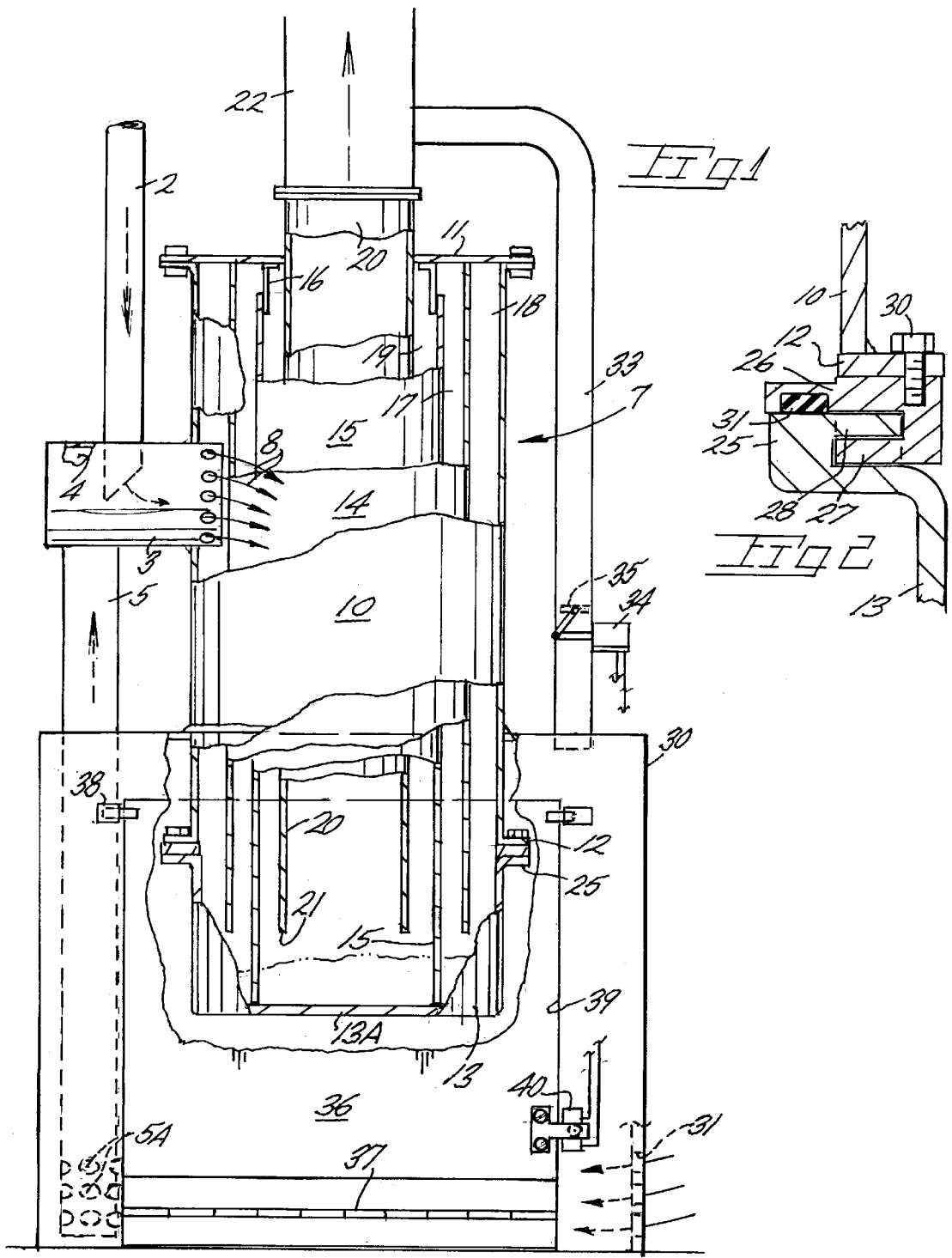

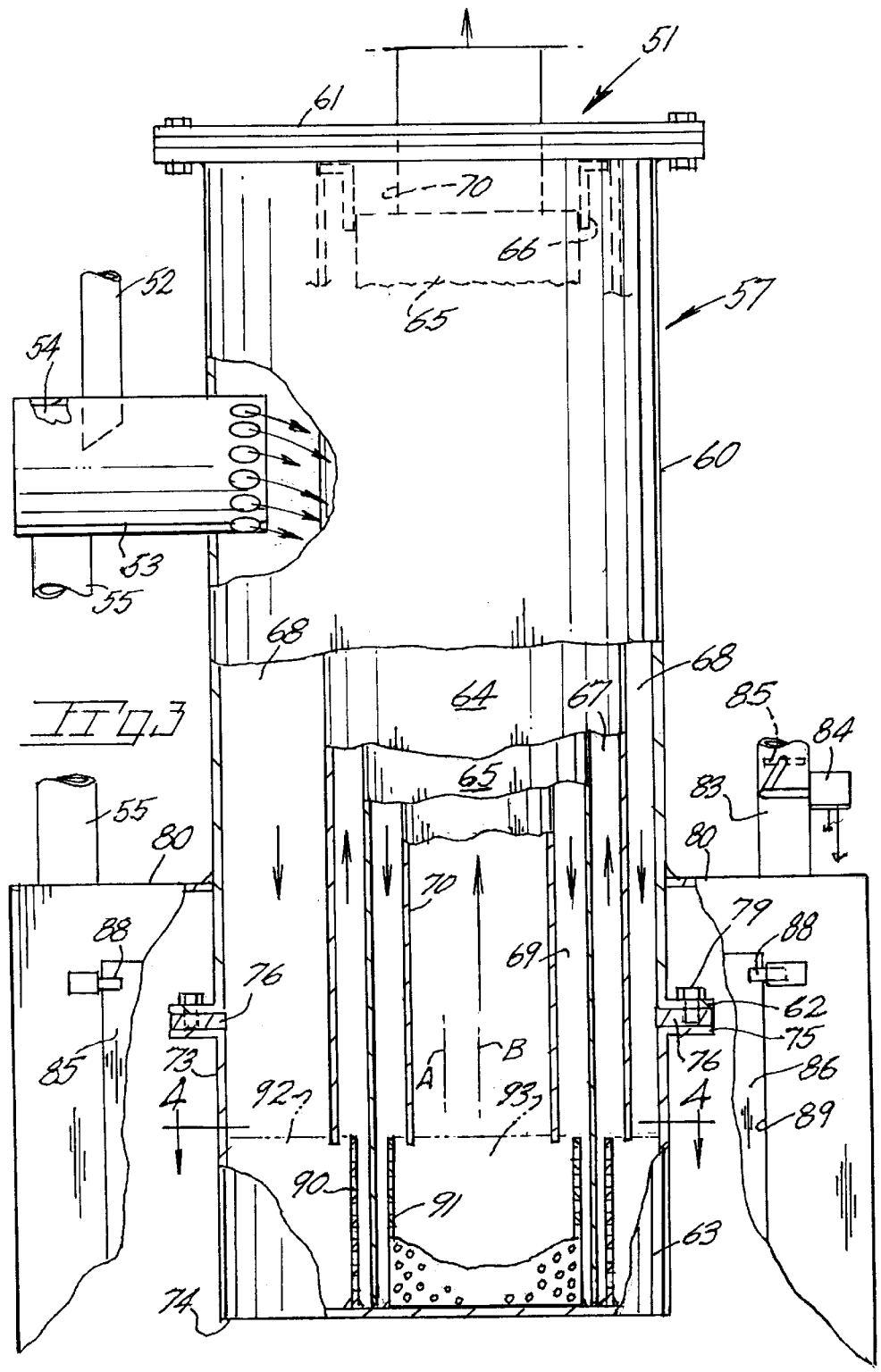

US 6,315,960 B1

APPARATUS FOR TREATING PYROPHORIC GASES AND TOXIC GLOBAL WARMING GASES

BACKGROUND OF THE INVENTION

The present invention is concerned with the removal of matter from gases including the separation of particulate therefrom.

In the manufacture of computer chips hazardous gases are generated which must be reduced to an inert state prior to being vented to the atmosphere. Silane gas, for example, occurs in the manufacture of semiconductors, photovoltaic and flat panels and cannot be vented to the atmosphere in view of its toxicity. The gas is pyrophoric and when oxidized results in the precipitation of particulate. Subsequent to such treatment the gas may be subjected to further processing, as by a scrubber, prior to release to the atmosphere. A co-pending patent application, Ser. No. 09/050,173, is currently pending and is directed toward the treatment of such hazardous gases, and is incorporated herein by reference.

SUMMARY OF THE PRESENT INVENTION

The present invention is embodied in an apparatus which mixes oxygen with a hazardous gas with provision made for convenient removal of particulate collected from the oxidized gas flow.

In the apparatus a mixing chamber receives air and a flow of a pyrophoric gas and discharges the combined flows into a separator having a series of radially spaced conduits arranged to direct the combined flow along reversed paths to separate particulate formed from the mixed and burned gases. The separator includes concentric tubular members constraining the mixed flow for travel in those areas defined by adjacent tubular members. A lowermost portion of the separator is located in an enclosure and constitutes a receptacle. Mounting means permits removal of the receptacle from the separator for cleaning purposes without interruption of related manufacturing operations. During cleaning the separator housing is ventilated to prevent the escape of hazardous gas and particulate from the housing interior. Automatic venting of the housing prevents escape of hazardous gas and particulate into the atmosphere during receptacle removal and reinstallation. A modified form of the separator includes added filtering and adsorbent features.

Important objectives of the present apparatus include the provision of a separator with concentric tubular members producing a reverse flow of a gas and air mixture with particulate from the mixture gravitating into a detachable receptacle enabling periodic removal of collected matter, the provision of a reverse flow separator including a detachable collector or receptacle located in an enclosure which at all times has a negative atmospheric pressure to preclude the release of hazardous gas to the atmosphere; the provision of a separator having a portion located within an enclosure with opening of the enclosure automatically providing a bypass in communication with a negative pressure source, such as a scrubber of an industrial plant, to prevent escape of hazardous gas to the atmosphere; the provision of a separator which subjects a pyrophoric gas to oxidation, filtration and chemical treatments. These and other objects will become clear upon an understanding of the following described structure.

BRIEF DESCRIPTION OF THE DRAWINGS

In the accompanying drawings:

FIG. 1 is an elevational view of the present apparatus with fragments broken away to disclose internal structure;

FIG. 2 is a fragmentary view of a detachably mounted receptacle of the separator.

FIG. 3 is a view similar to FIG. 1 showing a modified form of the separator of the present apparatus.

DETAILED DESCRIPTION OF THE PREFERRED EMBODIMENTS

Figure 4:
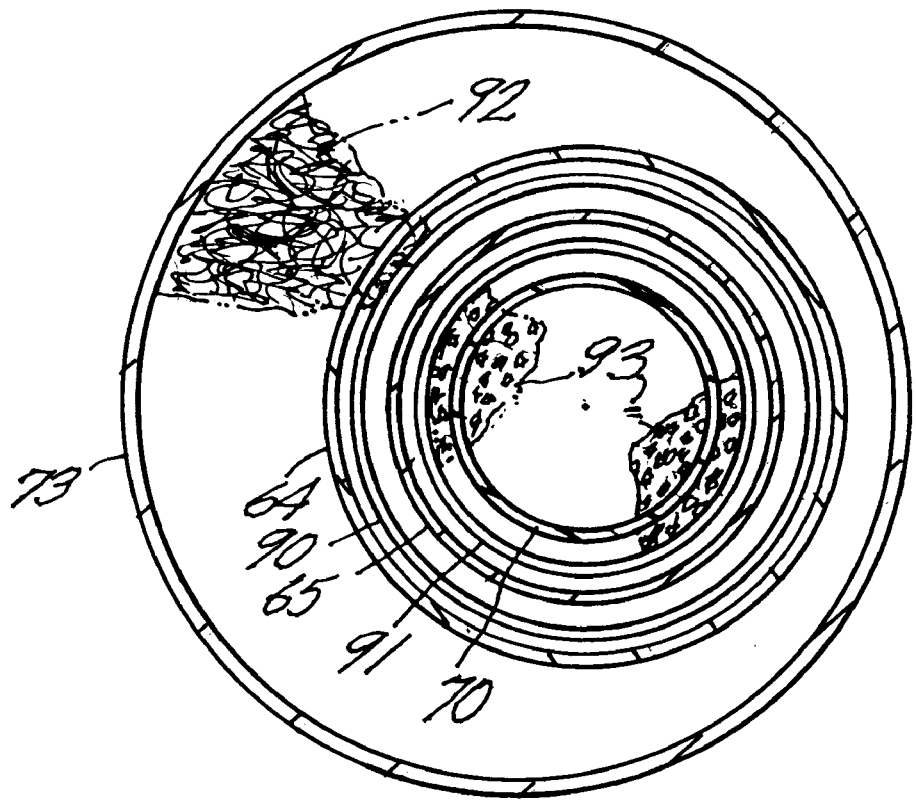
FIG. 4 is a horizontal section taken along line 4—4 of FIG. 3.

With continuing attention to the drawings, wherein reference numerals indicate parts similarly hereinafter identified, the reference numeral 1 indicates an apparatus for treating pyrophoric gas delivered through a conduit 2. Indicated at 3 is a structure defining a mixing chamber 4 in which the hazardous gas flow is received. A conduit 5 terminates at-conduit 3 and provides an oxygen flow for mixing with the hazardous gas as later described.

An upright housing is indicated generally at 7 and receives the discharge from chamber 4. Arrows 8 indicate the discharge of the products of combustion to the interior of a cylindrical component 10 of housing 7. A top plate 11 closes the upper end of cylinder 10 which terminates downwardly in a flanged end 12 to support a receptacle 13 having a bottom wall 13A. With continuing attention to housing 7, internal cylinder 14 depends from top plate 11 and terminates downwardly in receptacle 13 offset from bottom wall 13A. A third cylinder 15 depends from top plate 11, by means of hangers at 16, and is concentric with outer cylinder 14 but spaced therefrom to provide an annular passageway 17. Other passageways are at 18 and 19. An exhaust conduit 20 extends substantially the length of cylinder 15 and is offset from receptacle bottom 13A at its lowermost end 21 to receive an upward flow for discharge into an outlet 22 in communication with a below atmospheric pressure source which may be embodied in a scrubber apparatus. Cylinder 15 is in endwise abutment with receptacle bottom 13A to constrain the flow to upward passage in outlet 22.

Housing 7 is closed at its lower end by receptacle 13 having the general shape of a pan flanged at 25. With attention to FIG. 2, it will be seen that mounting means for receptacle 13 are provided by a ring 26 having lugs 27 spaced about the ring inner perimeter to provide circumferentially spaced openings through which receptacle lugs 28 may pass during receptacle installation and removal. Ring 26 is mounted to cylinder flange 12 as by fasteners 29 located at intervals about the flange. The foregoing mounting means is similar to that utilized, as for example, in pressure cookers utilized in food preparation. A seal 31 extends about ring 26 for seating abutment with receptacle flange 25.

From the foregoing it will be seen that the mixed oxygen and pyrophoric gas products enter housing 7 and pass downwardly intermediate housing outer wall 10 and internal cylinder 14 for entry into receptacle 13 whereat the flow is reversed for upward passage through passageway 17 intermediate second cylinder 14 and cylinder 15. A subsequent travel of the flow is downwardly in passageway 19 defined by cylinder 15 and exhaust conduit 20. A final reversal of the mixed oxygen and gas flow occurs adjacent bottom wall 13A of the receptacle for upward discharge via conduit 20 into outlet 22.

With attention still to FIG. 1, an enclosure at 30 is in place about the lower portion of housing 7 and is vented at 30A to the atmosphere to admit ambient air for entry into conduit 5 serving mixing chamber 4. Conduit 5 is apertured at 5A.

Housing 30 is periodically ventilated by a conduit 33 terminating in communication with outlet 22. A solenoid 34 serves to position a baffle 35 to close conduit 33 upon housing 30 being momentarily opened to the atmosphere when a door 36 is opened by an operator of the apparatus. Latches 38 normally retain door 36, hinged at 37, closed. Opening of door 36 actuates a switch at 40 to energize solenoid 34 to open baffle 35 for ventilation of the enclosure 30 as induced by the below atmospheric pressure source acting on outlet 22. Accordingly matter is prevented from escaping enclosure 30.

Operation of the apparatus is believed to be apparent from the foregoing. During operation receptacle 13 will collect precipitating matter resulting from the burning of a pyrophoric gas mixed with oxygen in chamber 3 and the tortuous serpentine flow through housing 7. Receptacle 13 is periodically detached by means of mounting means 26 from outer wall 10 of the housing to permit removal for discharge of collected particulate at P. Receptacle removal is achieved by arcuate rotation of same to disengage lugs 27 and 28 subsequent to which the receptacle may be moved downwardly in housing 30 and thereafter extracted outwardly through door opening 39. Openings 31 in housing 30 admit an ambient air flow into the housing for passage across the housing and into conduit 5 to purge any fumes that may collect in the housing during operation of the apparatus.

In FIG. 3, a modified form of the apparatus, generally at 51, is disclosed which additionally provides filtering and chemical treatment of the products from the burned pyrophoric gas. The modified apparatus at 51 is served by an inlet conduit 52 providing a hazardous gas flow into enclosure 53 defining a mixing chamber 54. An air flow is admitted to mixing chamber 54 by a conduit 55. A housing is indicated generally at 57 including an outer cylindrical component 60 terminating upwardly in a flange to receive a top plate 61. Component 60 is equipped with a bottom flange at 62 to which is attached, as later described, a receptacle 63. Interiorly of component 60 is a cylinder 64 to define a passageway 68 there-between through which flows, in a downwardly direction, the products of burned pyrophoric gas. A second cylinder 65 defines, with cylinder 64, still another passageway at 67 for the upward travel of the combustion products. Hangers at 66 support cylinder 65 in a manner providing an inlet upper end for the products which subsequently flow downwardly in a passageway 69 intermediate cylinder 65 and an exhaust conduit 70. Cylinder 65 terminates in abutment with receptacle 63. Accordingly the gas flow through housing 57 will be similar to the gas flow through the first described form of the separator apparatus.

With attention again to receptacle 63, the same includes a side wall 73 and a bottom wall 74 with the side wall terminating upwardly in a flange 75. Suitable mounting means includes ring 76 secured to flange 62 of cylinder 60 by fasteners 79. Ring 76 and flange 75 of receptacle 63 are provided with mounting means including interengageable lugs similar to that earlier described with the first described form of the invention to enable receptacle removal upon arcuate positioning of same.

An enclosure 80 is in place about the lower end segment of a separator housing 57. A conduit 83 serves to ventilate enclosure 80 upon opening of a housing door 86 as earlier described in the description of the first form of the invention. A door opening is at 89. Djwr latches are at 88. A solenoid is at 84 to position a baffle 85 as earlier described wherein a door activated switch (of the type shown in FIG. 1) closes a circuit, when opened, to solenoid 84.

With further attention to receptacle 63, the same is provided with radially spaced circular walls at 90 and 91 which are perforate to allow the passage of the flow being treated. A circular filter 92 occupies the annular space between wall 90 and side wall 73 of the receptacle to initially filter the incoming gas flow prior to initial reversal of flow direction upwardly through passageway 67. Circular wall 91 serves to confine a chemical bed 93 through which the gas from passageway 69 must flow prior to entry into exhaust conduit 70. The space defined by circular wall 91 is filled with a chemical agent such as a silical jell or a carbon bed for adsorption of toxic matter. Circular wall 91 is also perforate to admit gas flow about its perimeter with the flow ultimately passing upwardly through outlet conduit 70 in communication with a source of below atmospheric pressure.

In operation of the modified form of separator the flow from mixing chamber 54 passes downwardly about the exterior of cylinder 64, through filter 92 which may be of stainless steel composition, thence through passageways 67, 69 and into chemical bed 93 and ultimately drawn upwardly through the outlet 70 toward the low pressure source.

Toxic gases such as arsine $AsH_3$ and global warming gases such as hexafluoroethane $C_2F_6$ are abated by chemical bed 93 in receptacle 63.

It will be noted that the cylinders 64 and 65 and outlet conduit 70 are concentric about a vertical axis 8 which is preferably offset from the axis at A of housing 60 thereby avoiding restriction of the flow outward from mixing chamber 64.

While I have shown but a few embodiments of the invention, it will be apparent to those skilled in the art that the invention may be embodied still otherwise without departing from the spirit and scope of the invention. Having thus described the invention, what is desired to be secured by a Letters Patent is:

I claim:

1. An apparatus for treating a gas of a phyrophoric type and the collection of particulate resulting therefrom, said apparatus including, a housing of upright elongate shape and having a receptacle at a lower end of the housing, a gas and oxygen mixing chamber in communication with a source of hazardous gas and a source of oxygen and with the interior of said housing, radially spaced apart tubular members in said housing each having an oppositely disposed open end and a closed end adjacent opposite ends of the housing, said tubular members in communication with an outlet of the housing in communication with a source of negative pressure inducing a serpentine flow through passageways defined by the spaced apart tubular members, said receptacle for collecting matter from the flow, mounting means, attaching the receptacle to said housing in a detachable manner, an enclosure about at least a portion of said housing including a door for access to said receptacle for removal of same, and ventilating means for serving said enclosure, said ventilating means in controlled communication with a negative pressure source to prevent escape of gas and matter from the enclosure during removal of the receptacle.

2. The apparatus claimed in claim 1 wherein said mounting means includes lugs spaced about the perimeter of said receptacle, a ring carried by said housing having lugs spaced thereabout for locking engagement with the first mentioned lugs.

3. The apparatus claimed in claim 2 wherein said mounting means includes a seal.

4. The apparatus claimed in claim 1 wherein said enclosure defines an opening for the admission of ambient air, a conduit having an intake end in said enclosure to receive air entering the enclosure and airborne matter in the enclosure, said conduit terminating at an outlet in said mixing chamber.

5. The apparatus claimed in claim 1 wherein said ventilating means comprises conduit means in communication with the interior of said housing and said outlet, a baffle controlling flow in said conduit means, an actuator positioning said baffle.

6. The apparatus claimed in claim 5 wherein said ventilating means additionally includes a switch activated by the enclosure door and in circuit with said actuator.

7. The apparatus claimed in claim 1 wherein said receptacle includes a permeable filter in the path of the serpentine flow.

8. The apparatus claimed in claim 7 wherein said receptacle additionally includes a chemical bed in the path of the serpentine flow and perforate barriers confining said filter and chemical bed.

9. The apparatus claimed in claim 8 wherein one of said tubular members includes an end segment located between said filter and said chemical bed.

10. The apparatus claimed in claim 1 wherein said one of said tubular members terminates in said receptacle.

11. The apparatus claimed in claim 10 wherein said one of said tubular members is in endwise abutment with a bottom wall of the receptacle.

* * * * *